United States Patent [19]

Okada et al.

[11] Patent Number: 4,669,336
[45] Date of Patent: Jun. 2, 1987

[54] APPARATUS FOR CONTROLLING LINE PRESSURE USED IN V-BELT TYPE CONTINUOUSLY VARIABLE TRANSMISSION FOR AUTOMOBILE

[75] Inventors: Mitsuhiko Okada; Hiroshi Itoh; Nobuyuki Kato; Mitsuru Takada, all of Toyota, Japan

[73] Assignee: Toyota Jidosha Kabushiki Kaisha, Toyota, Japan

[21] Appl. No.: 693,160

[22] Filed: Jan. 22, 1985

[30] Foreign Application Priority Data

Jan. 27, 1984 [JP] Japan ................... 59-12017

[51] Int. Cl.⁴ .............. B60K 41/12; B60K 41/16
[52] U.S. Cl. ..................... 74/867; 474/28; 74/868
[58] Field of Search .......... 474/11, 12, 17, 18, 474/28, 70; 74/868, 867, 865, 862, 864

[56] References Cited

U.S. PATENT DOCUMENTS

| 4,161,894 | 7/1979 | Giacosa | 474/28 X |
|---|---|---|---|
| 4,462,277 | 7/1984 | Miki et al. | 74/867 |
| 4,476,746 | 10/1984 | Miki et al. | 74/867 |
| 4,522,086 | 6/1985 | Haley | 74/867 |
| 4,533,340 | 8/1985 | Abo et al. | 474/28 |
| 4,534,243 | 8/1985 | Yokoyama et al. | 474/28 X |
| 4,542,665 | 9/1985 | Yamamuro et al. | 74/867 X |

Primary Examiner—Leslie Braun
Assistant Examiner—Dirk Wright
Attorney, Agent, or Firm—Oblon, Fisher, Spivak, McClelland & Maier

[57] ABSTRACT

A continuously variable transmission (CVT) has input and output pulleys interconnected by a V-belt. The output pulley is actuated by a line pressure. A throttle pressure is increased as the position of an intake throttle valve arranged in an intake path is increased. A transmission-ratio pressure is decreased as the position of the intake throttle valve is increased. The transmission-ratio pressure is decreased in the region of smaller openings of the intake throttle valve more gently than in the region of larger ones. The line pressure is produced in relation to the throttle pressure and the transmission-ratio pressure.

8 Claims, 10 Drawing Figures

APPARATUS FOR CONTROLLING LINE PRESSURE USED IN V-BELT TYPE CONTINUOUSLY VARIABLE TRANSMISSION FOR AUTOMOBILE

BACKGROUND OF THE INVENTION

1. Field of the Invention

This invention relates to an apparatus for controlling a line pressure used in a V-belt type continuously variable transmission for an automobile (hereinafter called "CVT") used for a power transmitting apparatus of an automobile.

2. Description of the Prior Art

In the belt type CVT, a line pressure Pl is supplied to a hydraulic cylinder of an output side pulley.

The line pressure Pl should be controlled to a proper value of necessary minimum in which torque is transmitted by the belt without any troubles, and drive loss of an oil pump is to be avoided. FIG. 1 shows the relationship between a transmission-ratio $\gamma$ of a continuously variable transmission ($\gamma$=Nin/Nout, provided Nin is the input side rotational speed and Nout is the output side rotational speed) and an ideal proper line pressure Plo, assuming an engine torque is T, as a parameter, provided $T_1 > T_2$ with respect to the engine torque T. The more the engine torque T is increased and the transmission-ratio $\gamma$ is increased, the more the torque of the output side pulley is increased so that proper line pressure Plo is also increased.

In the prior line pressure controlling system producing such proper line pressure Plo, as shown in FIG. 2, a throttle pressure Pth as an increase function of the throttle position $\theta$ and a transmission-ratio pressure P$\gamma$ as a decrease function of the transmission-ratio $\gamma$ are produced as shown in FIG. 3 and used as pressures for controlling a line pressure producing valve. On a spool of the line pressure producing valve acts the following forces.

One directional force;

$$A1 \cdot Pl + (A2 - A1) \cdot P\gamma \qquad (1)$$

Other directional force;

$$A3 \cdot Pth + w \qquad (2)$$

provided A1, A2, A3 are cross-sectional areas of lands in the spool of the line pressure producing valve and w is a load on a spring. Thus, from the balance between both forces is established the following formulae.

$$A1 \cdot Pl + (A2 - A1) \cdot P\gamma = A3 \cdot Pth + w \qquad (3)$$

$$Pl = (A3/A1) \cdot Pth - [(A2 - A1)/A1] \cdot P\gamma + W/A1 \qquad (4)$$

While the proper line pressure Plo is defined by a curve as shown in FIG. 1, the line pressure Pl produced in the line pressure producing valve is a primary function of the throttle pressure Pth and the transmission-ratio pressure P$\gamma$ as shown in the formula (4) so that the line pressure Pl produced is difficult to coincide with the proper line pressure Plo.

When such produced line pressure Pl is applied to the actual CVT, the requirement of Pl>Plo must be satisfied to ensure the torque transmission in CVT, so that when the produced line pressure Pl is adapted to a large engine torque T1 and a small engine torque T2 the produced line pressure Pl, i.e. the actual line pressure Pl becomes as shown in FIGS. 4 and 5. The slant lines show the difference between the actual line pressure Pl and the proper one Plo, and Pl is substantially increased, compared with Plo, when the engine torque T2 is small and the transmission-ratio $\gamma$ is large in FIG. 4 and when the engine torque T1 is large and the transmission-ratio $\gamma$ is small in FIG. 5.

That the actual line pressure Pl is substantially increased, compared with the proper line pressure Plo, not only degrades the durability of the belt due to the increase of tension of the belt, but also increases the drive loss of an oil pump to degrade the specific fuel consumption.

SUMMARY OF THE INVENTION

An object of the present invention is to provide an apparatus for controlling a line pressure used in a V-belt type CVT for an automobile which is to permit a produced line pressure Pl to approach as close as possible a proper line pressure Plo defined by an engine torque T and a transmission-ratio $\gamma$ of the CVT.

To achieve this object according to the present invention, in an apparatus for controlling a line pressure used in a V-belt type CVT for an automobile in which the line pressure is supplied to a hydraulic cylinder of the output side pulley, are provided a throttle valve for producing a throttle pressure Pth as an increasing function of the a throttle position $\theta$ in an intake path of an engine, a transmission-ratio detecting valve for generating in an output port a transmission-ratio pressure P$\gamma$ as a decreasing function of the transmission-ratio $\gamma$ of the CVT and having a smaller gradient of decrease in the region less than a predetermined transmission-ratio $\gamma$ and a line pressure generating valve having a spool to make the transmission-ratio pressure P$\gamma$ act opposedly on the throttle pressure Pth and generating the line pressure Pl related with the spool position.

In the line pressure generating valve, while a force opposed to the throttle pressure Pth is increased to reduce the line pressure Pl as the transmission-ratio pressure P$\gamma$ is increased, the rate of increasing the transmission-ratio pressure P$\gamma$ is reduced at a low a predetermined transmission-ratio $\gamma$ so that the reduction of the line pressure Pl is also restrained. Thus, the difference between Pl and Plo is to be lessened while the actual line pressure Pl is ensured in at least proper line pressure Plo.

For example, if the upper limit of the transmission-ratio pressure P$\gamma$ is specified to the line pressure Pl, the gradient of reducing the transmission-ratio pressure P$\gamma$ as a decreasing function of the transmission-ratio $\gamma$ is to be lessened in the region below a predetermined transmission-ratio $\gamma$.

Thus, according to the present invention, since the transmission-ratio pressure P$\gamma$ is a decreasing function of the transmission-ratio $\gamma$ and the upper limit thereof is specified by the line pressure Pl, the line pressure Pl has a value defined by formula (4) in the region of the transmission-ratio $\gamma$ where the transmission-ratio pressure P$\gamma$ is larger than the transmission-ratio $\gamma$1 reaching the line pressure Pl, while P$\gamma$=Pl in the region of the transmission-ratio $\gamma$ less than $\gamma$1 so that the line pressure Pl is represented by the following formula;

$$Pl = (A3/A2) \cdot Pth + (1/A2)W \qquad (5)$$

FIGS. 6 and 7 show the line pressure Pl produced according to the present invention, in which the broken line shows the transmission-ratio pressure Pγ generated in the transmission-ratio detecting valve when the line pressure Pl is sufficiently high. The characteristics such as gradient of the transmission-ratio pressure Pγ are to be set at will by changing the respective constants of the transmission-ratio detecting valve. Since Pγ<Pl in the region of large transmission-ratio γ, produced line pressure Pl has a value defined by the formula (4), while, in the region of small transmission-ratio γ, Pγ=Pl and the produced line pressure Pl has a constant value as defined by the formula (5). Thus, as shown in FIGS. 6 and 7, the difference between the produced line pressure Pl and the proper line pressure Plo is reduced so that the hatched areas are remarkably reduced.

As a result, the degradation of durability of a belt and specific fuel consumption due to the drive loss of an oil pump are to be prevented.

Preferably, the throttle valve has a spool receiving opposedly a working force increased as the throttle position θ in an engine intake path is increased and the throttle pressure Pth to be axially moved and an output port having the connection with the line pressure oil path controlled in relation to the spool position to generate the throttle pressure Pth, and the transmission-ratio detecting valve has an output port connected to the line pressure oil path through an orifice and a spool receiving a working force related to the axial position of the input side movable pulley of the continuously variable transmission to control the connection of the output port with the drain in relation to the working force. And the line pressure generating valve has a line pressure generating port connected to the line pressure oil path, a first spool comprising a first land having a cross-sectional area Al receiving the line pressure Pl as a feed-back pressure and second and third lands having cross-sectional areas A1, A2 receiving the transmission-ratio pressure Pγ to control a hydraulic medium discharge from the line pressure generating port in relation to the axial position and a second spool having a fourth land having a cross-sectional area A3 receiving the throttle pressure Pth and disposed coaxially with the first spool.

The accompanying drawings, which are incorporated in and constitute part of this specification, illustrate embodiments of the invention and, together with the description, serve to explain the principles of the invention.

SIMPLE DESCRIPTION OF THE INVENTION

DESCRIPTION OF PREFERRED EMBODIMENTS

Figure 8:
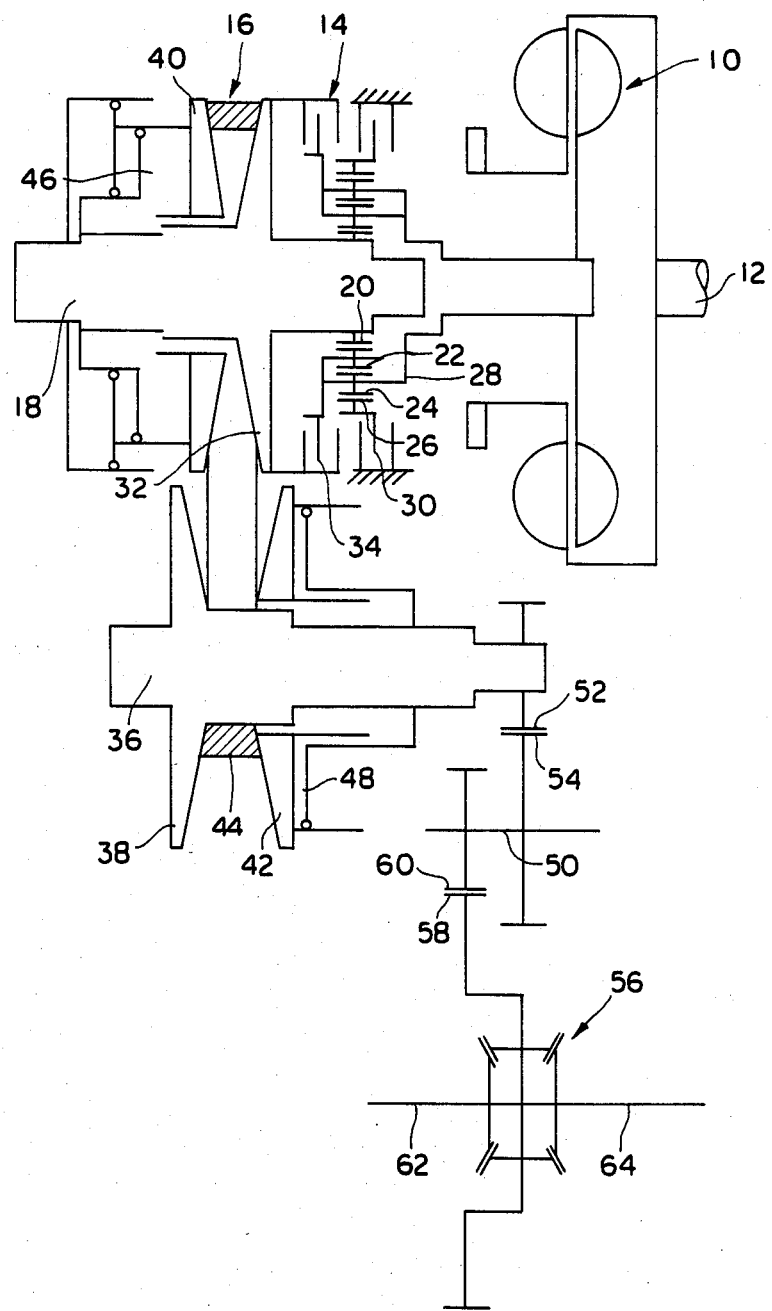
FIG. 8 is a schematic view showing the whole power transmitting apparatus including the CVT.

In FIG. 8, a fluid clutch 10 is provided coaxially with a crankshaft 12 of an engine and a planet gear mechanism 14 to transmit an engine power from the crankshaft 12 to the planet gear mechanism 14. The planet gear mechanism 14 is provided with a sun gear 20 secured fixedly to an input shaft 18 of a CVT 16, a first planetary gear 22 meshing with this sun gear 20, a second planetary gear 24 meshing with this first planetary gear 22, a ring gear 26 meshing with the second planetary gear 24, a carrier 28 supporting rotatably the first and second planetary gears and connected to a fluid coupling 10, a backward brake 30 for controlling the fixation of the ring gear 26 and a forward clutch 34 for controlling the connection of an input side fixed pulley 32 of the CVT 16 with the carrier 28. The input shaft 18 of the CVT 16 is provided coaxially with the planetary gear mechanism 14 and an output shaft 36 is provided parallel to the input shaft 18. The input side fixed pulley 32 and an output side fixed pulley 38 are fixed respectively to the input shaft 18 and the output shaft 36. An input side movable pulley 40 and an output side movable pulley 42 are provided to be opposed respectively to the input side fixed pulley 32 and the output side fixed pulley 38 and axially movable and circumferentially fixedly on the input shaft 18 and the output shaft 36. A belt 44 has an equilateral trapezoidal cross section and the side surfaces frictionally contacting tapered press surfaces of the input side fixed pulley 32, the output side fixed pulley 38, the input side movable pulley 40 and the output side movable pulley 42. The axial positions of the input side movable pulley 40 and the output side movable pulley 42 are controlled respectively by oil pressures Pin, Pout in an input side hydraulic cylinder 46 and an output side hydraulic cylinder 48. A counter shaft 50 is provided parallel to the output shaft 36 and has a gear 54 meshing with a gear 52 on the output shaft 36 and a gear 60 meshing with a ring gear 58 of a differential assembly 56. Axle shafts 62, 64 extend parallel to the counter shaft 50 from the differential assembly 56 to transmit an engine power to left and right drive wheels.

Figure 1:
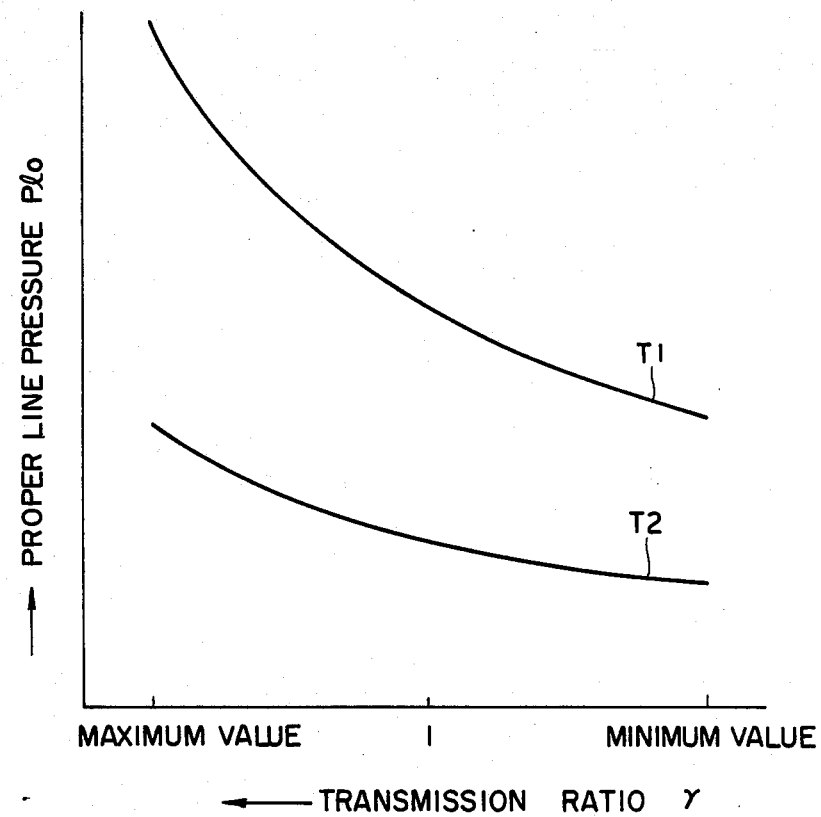
FIG. 1 is a graph showing the relationship between the transmission-ratio of a CVT as the engine torque as a parameter and the ideal proper line pressure.
Figure 2:
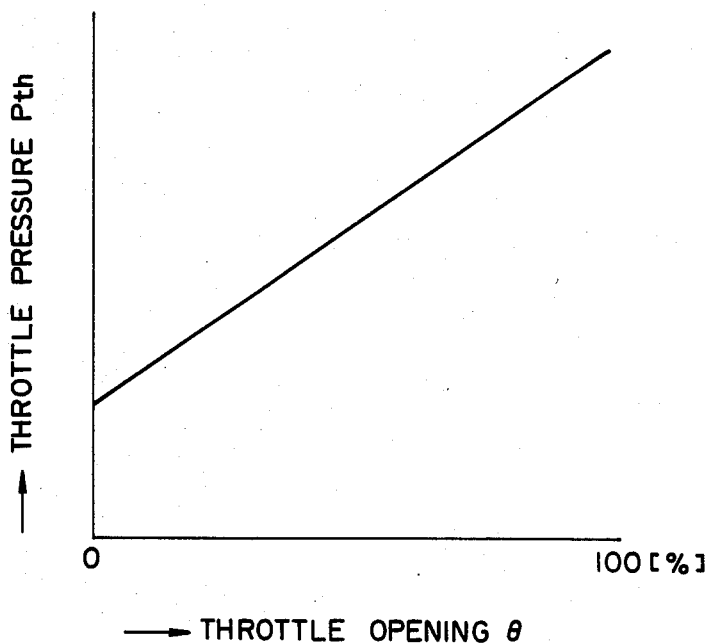
FIG. 2 is a graph showing the relationship between the throttle position and the throttle pressure.
Figure 3:
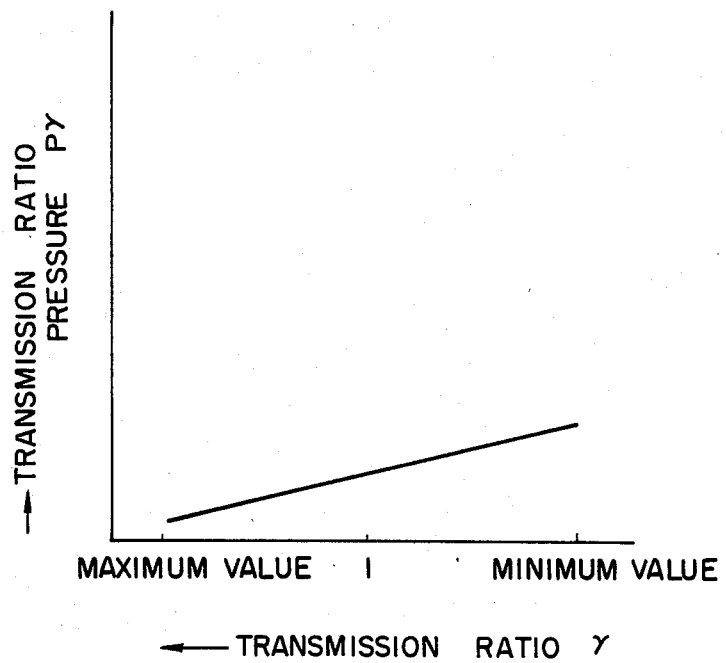
FIG. 3 is a graph showing the relationship between the transmission-ratio of the CVT and the transmission-ratio pressure Pγ.
Figure 4:
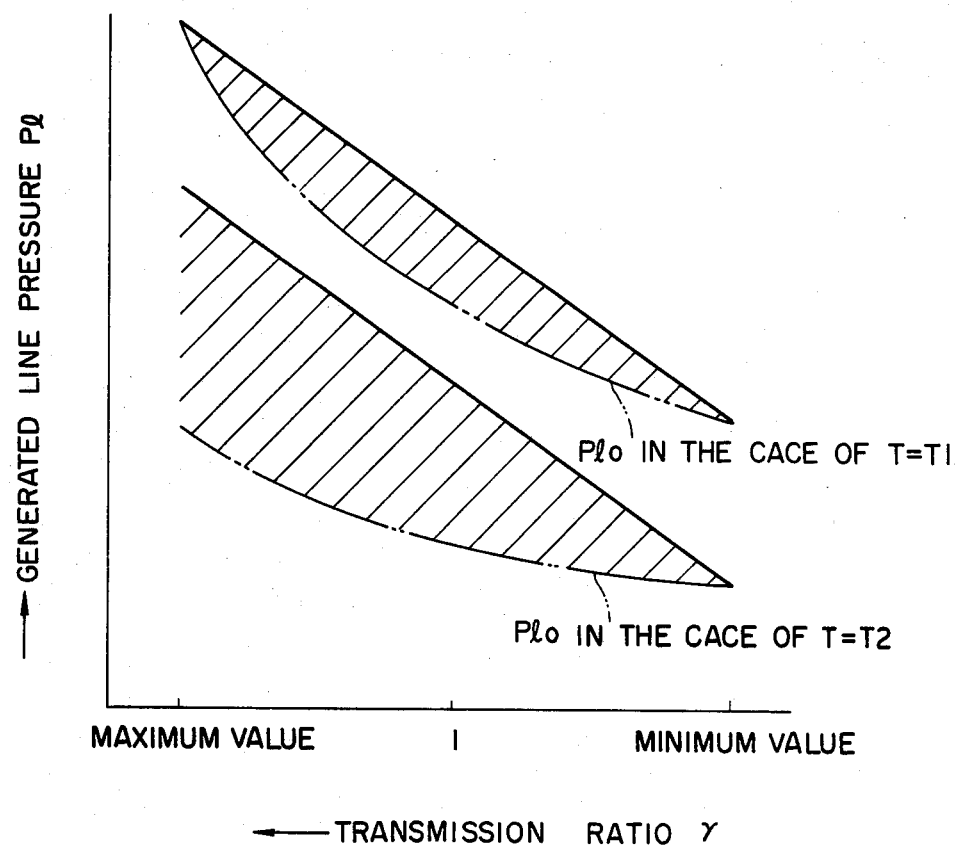
FIG. 4 is a graph showing the characteristics of the line pressure Pl produced when adapted to the large engine torque.
Figure 5:
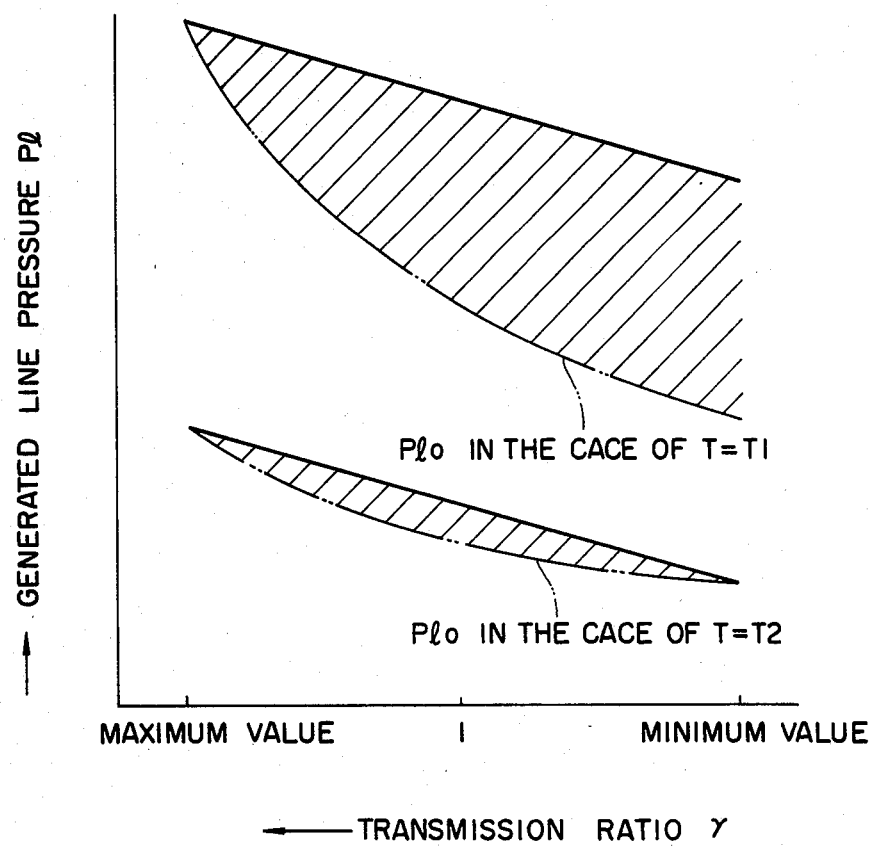
FIG. 5 is a graph showing the characteristics of the line pressure Pl produced when adapted to the small engine torque.
Figure 9:
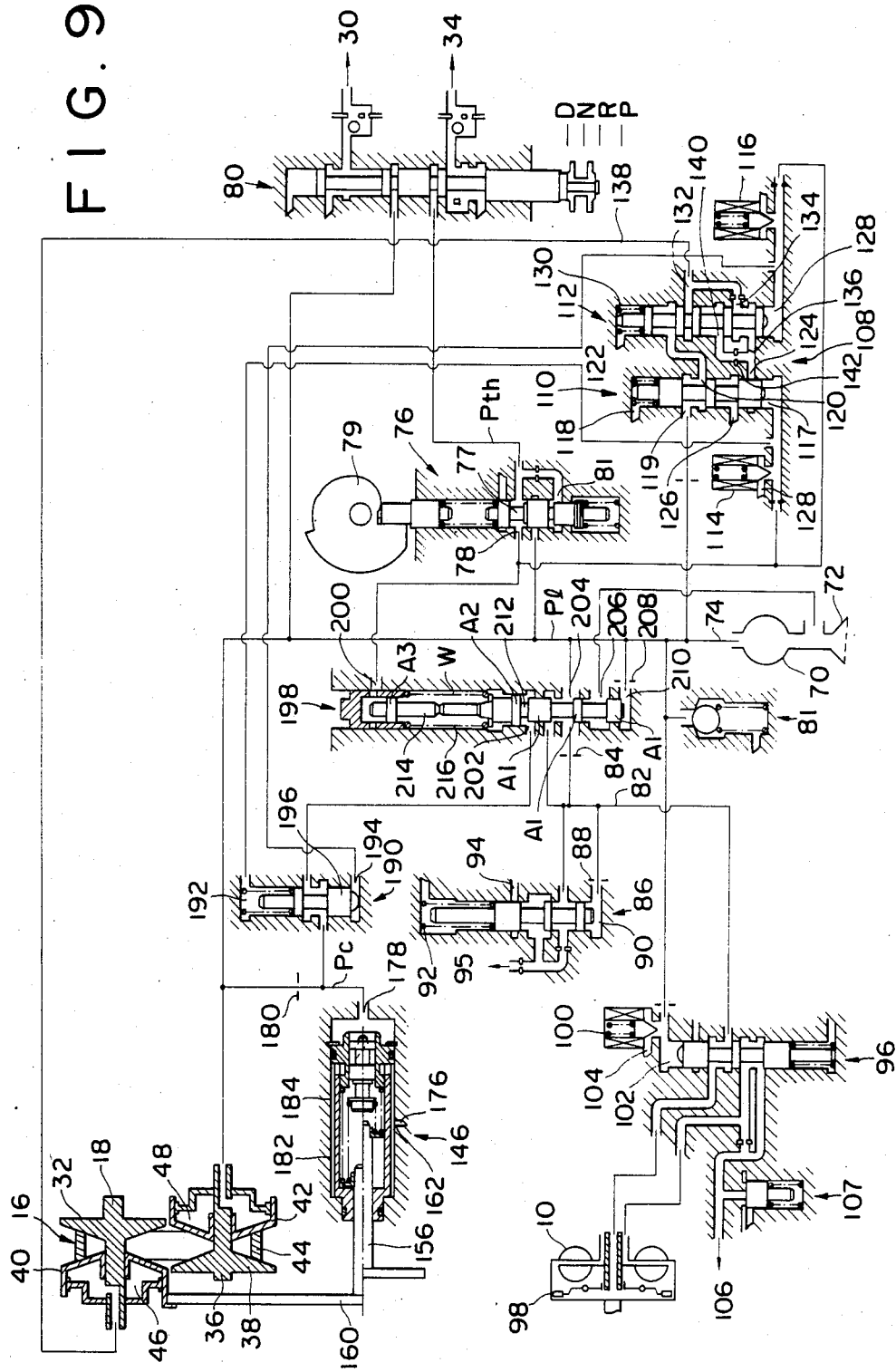
FIG. 9 is a hydraulic control circuit diagram.

In FIG. 9, an oil pump 70 pressurizes oil sucked through a strainer 72 and supplies it to a line pressure oil path 74. A throttle valve 76 generates in the output port 78 the throttle pressure Pth (FIG. 2) related to the throttle position θ in the intake path. A spool 77 of the throttle valve 76 receives opposedly the working force increasing along with the increase of the throttle position θ from a throttle cam 79 and the throttle pressure Pth as the feedback pressure from a control port 81 to control the connection of the line pressure oil path 74 with the output port 78. A manual valve 80 has the axial position controlled in relation to the range of D(drive), N(neutral), R(reverse) and P(parking) of a shift lever to conduct the throttle pressure Pth to the hydraulic cylinder of the forward clutch 34 in the D range and the line pressure Pl to the hydraulic cylinder of the backward brake 30 in the R range. A relief valve 83 as a safety valve functions to release oil in the line pressure oil path 74 when the line pressure Pl exceeds a predetermined value.

A secondary oil pressure path 82 is connected to the line pressure oil path 74 through an orifice 84, and a secondary pressure regulator valve 86 has a control chamber 90 connected to the secondary oil pressure oil path 82 through an orifice 88 to control the connection of the secondary oil pressure oil path 82 with a drain 94 in relation to oil pressure in the control chamber 90 and a load on a spring 92 and maintain oil pressure in the secondary oil pressure oil path 82 at a predetermined value. A lubricating oil path 95 is connected to the secondary oil pressure oil path 82 through the secondary regulator valve 86. A lock-up controlling valve 96 selectively connects the secondary oil pressure oil path 82 to the engaging side and the release side of a lock-up clutch 98 positioned in parallel to the fluid clutch 10. An electromagnetic valve 100 controls the connection of a control chamber 102 in the lock-up controlling valve 96 with a drain 104. When the electromagnetic valve 100 is turned off (unexcited), oil pressure from the secondary oil pressure oil path 82 is transmitted to the release side of the lock-up clutch 98, and the engine power is transmitted through the fluid clutch 10. When the electromagnetic valve 100 is turned on (excited), oil pressure from the secondary oil pressure oil path 82 is supplied to the engaging side of the lock-up clutch 98 and an oil cooler 106 to transmit the engine power through the lock-up clutch 98. A relief valve 107 controls a cooler pressure.

A transmission-ratio control unit 108 is provided with first and second spool valves 110, 112 and first and second electromagnetic valves 114, 116. While the first electromagnetic valve 114 is turned off, the spool of the first spool valve 110 is urged toward a spring 118 by the throttle pressure Pth in a chamber 117, and the line pressure Pl in a port 119 is sent to the port 12 of the second spool valve 112 through a port 120 of the first spool valve 110 so that a port 124 is disconnected from a drain 126. While the first electromagnetic valve 114 is turned on, oil pressure in the chamber 117 is drained through a drain 128 of the first electromagnetic valve 114 and the spool in the first spool valve 110 is urged toward the chamber 117 by the spring 118 so that the line pressure Pl is not generated in the port 120 and the port 124 is connected to the drain 126. Also, while the second electromagnetic valve 116 is turned off, the spool in the second spool valve 112 is urged toward a spring 130 by the throttle pressure Pth in a chamber 128 so that the port 122 is disconnected from a port 132 and a port 134 is connected to a port 136. The ports 132, 134 are connected to the input side hydraulic cylinder 46 of the CVT 16 through an oil path 138. While the second electromagnetic valve 116 is turned off, the spool in the second spool valve 112 is urged toward the chamber 128 by the spring 130, the port 122 is connected to the port 132 and the port 134 to a port 140. A port 136 is connected to a port 124 and the port 140 to the port 124 through an orifice 142. Thus, while the first electromagnetic valve 114 is turned off and the second electromagnetic valve 116 is turned on, oil is supplied rapidly to the input side hydraulic cylinder 46 to lower the transmission-ratio γ. While the first electromagnetic valve 114 is turned off and the second electromagnetic valve 116 is turned off, oil is neither supplied to the input side hydraulic cylinder 46 nor discharged from the input side hydraulic cylinder 46 so that the transmission-ratio γ of the CVT 16 is held constant. When the first electromagnetic valve 114 is turned on and the second electromagnetic valve 116 is turned on, oil in the input side hydraulic cylinder 46 is discharged through the orifice 142 so that the transmission-ratio γ of the CVT 16 is increased gradually. While the first electromagnetic valve 114 is turned on and the second electromagnetic valve 116 is turned off, oil in the input side hydraulic cylinder 46 is discharged without passing through the orifice 142 so that the transmission-ratio γ of the CVT 16 is abruptly increased.

Figure 6:
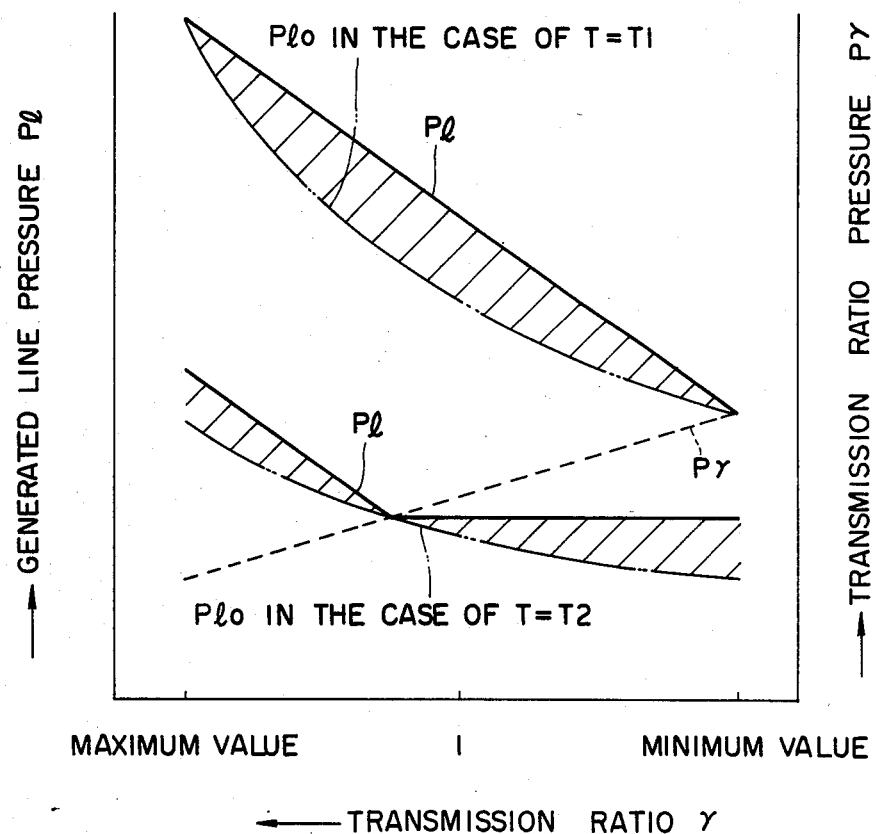
FIGS. 6 and 7 are graphs illustrating respectively the characteristics of the produced line pressure according to the present invention.
Figure 7:
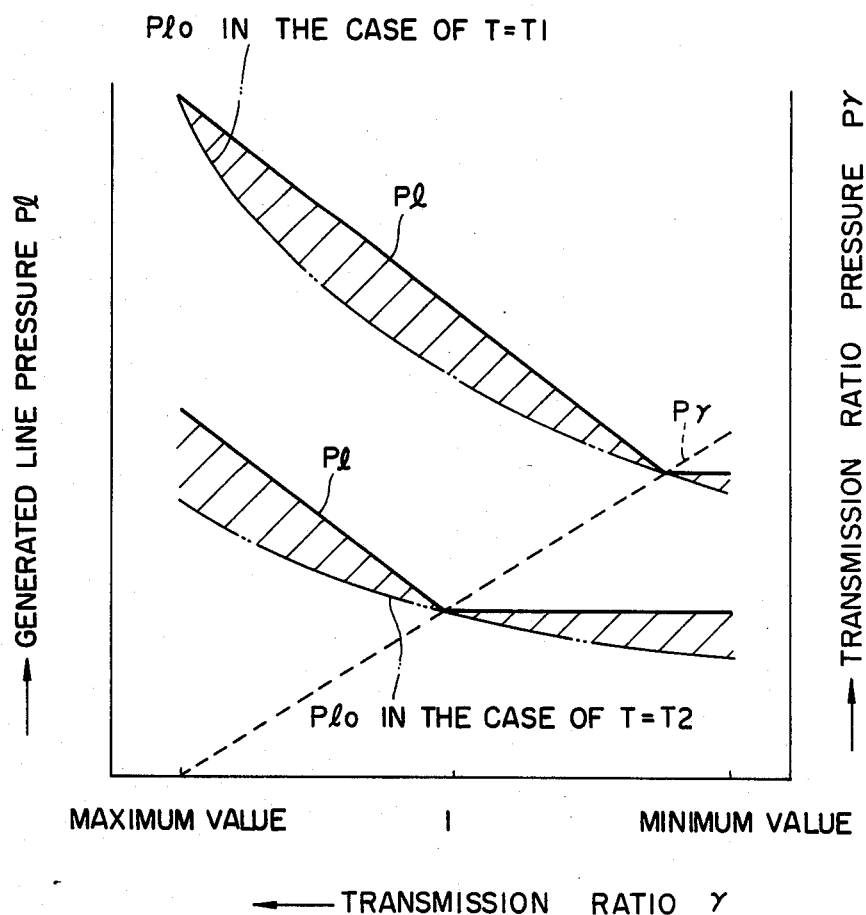
Figure 10:
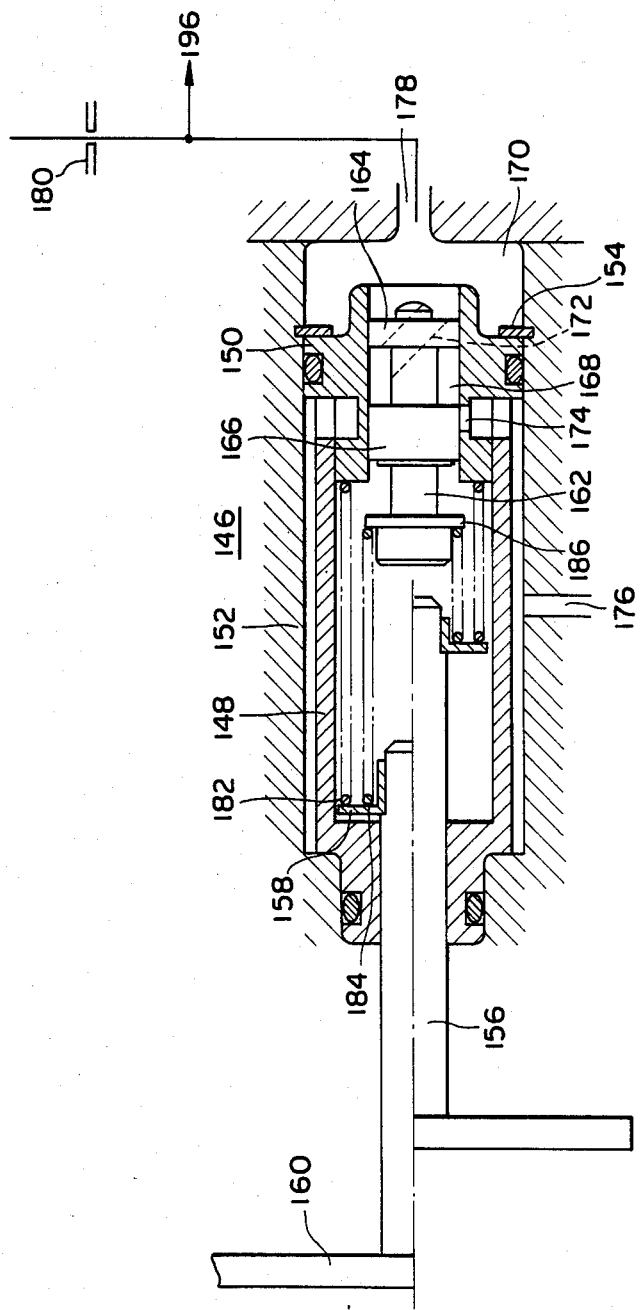
FIG. 10 is a detailed view showing the transmission-ratio detecting valve as a control pressure generating valve.

Details of a transmission-ratio detecting valve 146 is shown in FIG. 10. Sleeves 148, 150 are arranged coaxially in a valve hole 152 and axially fixed by a snap ring 154. A rod 156 extends through an end of the sleeve 148 and has a washer seat 158 fixed. Another rod 160 is coupled on both ends respectively with the input side movable pulley 40 and the rod 156 to move axially the rod 156 by the displacement equal to the axial displacement of the input side movable pulley 40. A spool 162 has lands 164, 166 and fits in the sleeve 150 to move axially. The land 164 has a surface subject to the pressure at port 178 and has a path 172 through which a space 168 between the lands 164 and 166 communicates to an oil chamber 170, and the land 166 controls the opening area of a port 174 of the sleeve 150 communicating to the space 168. The port 174 is connected to a drain 176 through a space around the outer periphery of the sleeve 148. The oil chamber 170 has an output port 178 in which a control pressure Pc is generated and which is connected to the line pressure oil path 74 through an orifice 180. A spring 182 is provided between a spring carrier 158 and the sleeve 150 to urge the rod 156 to push it out of the sleeve 148, and a spring 184 is provided between the spring carrier 158 and a flange 186 of the spool 162 to urge the spool 162 toward the oil chamber 170. As the displacement of the input side movable pulley 40 relative to the input side fixed pulley 32 is increased, the transmission-ratio γ is increased. Since the rod 156 is pushed out of the sleeve 148 by the increase of the displacement of the input side movable pulley 40, the force of the spring 184 urging the spool 162 toward the oil chamber 170 is reduced. As a result, the spool 162 moves toward the rod 156 and the land 166 increases the opening area of the port 174 to increase the discharge flow of oil so that the transmission-ratio pressure Pγ in the output port 178 is reduced. Since the transmission-ratio pressure Pγ is generated by controlling the discharge of hydraulic medium in the output port 178, the upper limit is specified to the line pressure Pl. The broken lines in FIGS. 6 and 7 show two relationships between the transmission-ratio pressure Pγ and the transmission-ratio γ. As will be later described, while the line pressure Pl is reduced as the transmission-ratio γ is reduced, when the transmission-ratio pressure Pγ is reduced to provide the transmission-ratio γ1 (the transmission-ratio γ1 is a function of the throttle pressure Pth, thus the engine torque T) in which the transmission-ratio pressure Pγ is equalized to the line pressure Pl, Pγ=Pl in the region of the transmission-ratio less than γ1.

Again in FIG. 9, a cut-off valve 190 has a spool 196 moving in relation to oil pressure in chambers 192, 194 communicating to the chambers 117, 128 of the transmission-ratio control unit 108. While the first electromagnetic valve 114 is turned on and the second electromagnetic valve 116 is turned off, that is, only while the transmission-ratio γ of the CVT 16 needs to be abruptly increased, the cut-off valve 190 blocks the transmission of the transmission-ratio pressure Pγ to a primary regulator valve 198.

The primary regulator valve 198 as a line pressure generating valve is provided with a port 200 to which the throttle pressure Pth is supplied, a port 202 to which the transmission-ratio pressure Pγ is supplied, a port 204 connected to the line pressure oil path 74, a drain 206 connected to the intake side of the oil pump 70, a chamber 210 to which the line pressure Pl is supplied through an orifice 208, a spool 212 movable axially to control the connection of the port 204 with the drain 206, a spool 214 for receiving the throttle pressure Pth to urge the spool 212 toward the chamber 210 and a spring 216 for urging the spool 212 toward the chamber 210. Defining the respective cross sectional areas of lands of the spools 212, 214 as A1,A1,A1,A2,A3 (provided A1<A2<A3) sequentially in the order from the lower land and the load of the spring 216 as W, is established from the balance relationship the following formula;

$$W + A3 \cdot Pth = A1 \cdot Pl + (A2 - A1) \cdot Pc \qquad (6)$$

Said formula (4) is one obtained from this formula (6) defined with respect to Pl.

Accordingly, since the transmission-ratio pressure Pγ is defined by the broken line in FIG. 6 or 7, the line pressure Pl is defined as the formula (4) in the region of the transmission-ratio of Pγ<Pl, and the line pressure Pl is defined as the formula (5) in the region of the transmission-ratio of Pγ=Pl. As a result, the increment of the produced line pressure Pl to the proper line pressure Plo is to be reduced.

Further, when the transmission-ratio detecting valve 146 is stuck or the circuit for transmitting the transmission-ratio pressure Pγ from said valve 146 to the primary regulator valve 198 produces oil leakage to reduce abnormally the transmission-ratio pressure Pγ in the port 202, the line pressure Pl is increased so that the slippage and damage of the belt 44 is to be avoided and prevented even if abnormalities such as the stick of the valve take place.

Also, since both the throttle pressure Pth and the transmission-ratio pressure Pl opposed to each other in the primary regulator valve 198 act on the spool 212 from one end of the valve 198, the cross sectional areas of lands receiving the throttle pressure Pth and the transmission-ratio pressure Pγ are to be set to large values to improve the accuracy in control.

It will be apparent to those skilled in the art that various modifications and variations may be made in the elements of the invention without departing from the scope or spirit of the invention.

What is claimed is:

1. A control device, for a continuously variable belt transmission device comprising a driving pulley assembly including an axially fixed pulley member and an axially movable pulley member, a driven pulley assembly including an axially fixed pulley member and an axially movably pulley member, an endless belt assembly which is fitted in a power transmitting manner around said driving pulley assembly and said driven pulley in V-shaped grooves defined between said axially fixed and said axially movable pulley members thereof to provide power transmission therebetween at a transmission speed change ratio, and first and second pressure chambers for said driving and driven pulley assemblies respectively, each of which according to a supply of hydraulic fluid pressure to it alters the axial distance between its respective axially fixed pulley member and its respective axially movable pulley member so as to alter the effective pulley radius of its respective one of said driving and driven pulley assemblies, said control device supplying a line pressure to said second pressure chamber for said driven pulley assembly, and comprising:

a throttle valve having means for generating a throttle pressure Pth as an increasing function of all throttle positions $\theta$ in an intake path of an engine;
a transmission ratio detecting valve comprising:
(a) a transmission ratio pressure port,
(b) restriction means communicating said transmission ratio pressure port with a source of said line pressure,
(c) a drain in fluid communication with said transmission ratio pressure port,
(d) a spool movable for selectively closing said drain, whereby a transmission ratio pressure P γ is established at said transmission ratio pressure port,
(e) mechanicla means for moving said spool for opening said drain in response to an increase in said transmission ratio γ and for closing said drain in response to a decrease in said transmission ratio,
(f) means for moving said spool in a direction for opening said drain in response to an increase in the pressure at said transmission ratio pressure port, and for closing said drain in response to a decrease in the pressure at said transmission ratio pressure port, whereby said transmission ratio pressure increases to equal said line pressure below a predetermined transmission ratio γ1, and whereby said predetermined transmission ratio varies as a decreasing function of said transmission ratio pressure; and
a line pressure generating valve having means for accepting said throttle pressure and said transmission ratio pressure as control pressures and for establidhing said line pressure as an increasing function of said throttle pressure and a decreasing function of said transmission ratio pressure.

2. The control device of claim 1, wherein the throttle valve comprises a spool having means for receiving a working force proportional to the throttle position $\theta$ in the intake path of the engine and a feedback throttle pressure Pth in opposition to said working force, and a throttle pressure output port connected to a line pressure oil path via said spool to generate the throttle pressure Pth.

3. The control device of claim 1, wherein the line pressure generating valve includes a line pressure generating port, a first spool having a first land with a cross sectional area A1 receiving said line pressure Pl as a feed-back pressure, second and third lands comprising said means for accepting said transmission ratio pressure, said second and third lands having cross sectional areas A1, A2 receiving the transmission-ratio pressure Pγ to control hydraulic medium discharge from the line pressure generating port in relation to the axial position, and a second spool having a fourth land comprising said means for accepting said throttle pressure, said fourth land having a cross sectional area A3 receiving the throttle pressure Pth and disposed coaxially with the first spool.

4. The control device of claim 1 wherein said mechanical means for moving said spool comprise:

a rod mechanically connected to said movable pulley member of said driving pulley assembly for movement toward and away from said spool; and spring means extending between said rod and said spool for biasing said spool for movement in a direction for closing said drain.

5. The control device of claim 4 wherein said means for moving said spool in response to the pressure at said transmission ratio pressure port comprises a land of said spool having a surface subject to said pressure at said transmission ratio pressure port, said surface extending normal to said direction of movement of said spool.

6. The control device of claim 5 wherein said land is positioned between said transmission ratio pressure port and said drain, and includes a fluid path for communicating said transmission ratio pressure port with said drain.

7. The control device of claim 1 wherein said means for moving said spool in response to the pressure at said transmission ratio pressure port comprises a land of said spool having a surface subject to said pressure at said transmission ratio pressure port, said surface extending normal to said direction of movement of said spool.

8. The control device of claim 7 wherein said land is positioned between said transmission ratio pressure port and said drain, and includes a fluid path for communicating said transmission ratio pressure port with said drain.

* * * * *